(12) United States Patent
Anderson

(10) Patent No.: US 7,362,325 B2
(45) Date of Patent: Apr. 22, 2008

(54) 2D/3D LINE RENDERING USING 3D RASTERIZATION ALGORITHMS

(75) Inventor: Michael Hugh Anderson, Leucadia, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 11/019,719

(22) Filed: Dec. 21, 2004

(65) Prior Publication Data

US 2006/0132495 A1    Jun. 22, 2006

(51) Int. Cl.
 *G06T 15/00* (2006.01)
(52) U.S. Cl. .................. 345/419; 345/441; 345/443; 345/503; 345/581; 345/596
(58) Field of Classification Search ................ 345/581, 345/419, 441, 443, 503, 596
See application file for complete search history.

(56) References Cited

U.S. PATENT DOCUMENTS

| | | | | |
|---|---|---|---|---|
| 5,381,519 A | * | 1/1995 | Brown et al. | 345/596 |
| 5,446,836 A | * | 8/1995 | Lentz et al. | 345/441 |
| 5,528,737 A | * | 6/1996 | Sfarti | 345/441 |
| 6,636,218 B1 | | 10/2003 | Nelson | |

FOREIGN PATENT DOCUMENTS

EP    1345177    3/2002

OTHER PUBLICATIONS

Michael D. McCool, Chris Wales, Kevin Moule, "Incremental and Hierarchical Hilbert Order Edge Equation Polygon Rasterization", Published in Graphcis Hardware 2001.*

* cited by examiner

*Primary Examiner*—Kimbinh T. Nguyen
(74) *Attorney, Agent, or Firm*—Matthew J. Evans; Timothy F. Loomis; Thomas R. Rouse

(57) ABSTRACT

This patent discloses a system and method to compile a set of display points that define a two dimensional representation of a straight line graphic object using three dimensional rasterization algorithms. In one embodiment, a three dimensional (3D) graphics accelerator may receive data. The data may define three vertices (x0, y0, K0), (x1, y1, K1), and (x2, y2, K2) of a triangle primitive. Attributes K2=(K0+K1)/2 and coordinates (x0, y0), (x1, y1), and (x2, y2) form an isosceles triangle primitive. Coordinates (x0, y0) and (x1, y1) define a base of the isosceles triangle primitive. The isosceles triangle primitive may be rendered using the three dimensional rasterization algorithms to obtain the set of display points that define a two dimensional representation of the base of the isosceles triangle primitive.

37 Claims, 7 Drawing Sheets

2D/3D LINE RENDERING USING 3D RASTERIZATION ALGORITHMS

BACKGROUND

1. Field

The field generally includes computer graphics processing, and more specifically includes subject matter where a set of display points define a two dimensional representation of a straight line graphic object using three dimensional rasterization algorithms.

2. Background

Today, every aspect of computing, from creating animation to simple tasks such as word processing and e-mail, uses many graphics to create a more intuitive work environment for the user. Video adapters are graphic cards that plug into a personal computer to give the computer the capability to display graphical images. A video adapter that includes its own graphics processor is often called a graphics accelerator.

Because they contain their own memory and processor, graphics accelerators allow computers to display complex images faster on a display screen. A graphics accelerator achieves better results than the general-purpose central processing unit (CPU) used by a computer since its processor specializes in computing graphical transformations. In addition, a graphics accelerator frees up the computer's CPU to execute other commands while the graphics accelerator is handling graphics computations.

In the early days of computers, the graphics consisted of two dimensional images—points, lines, and squares that required only a two dimensional (2-D) graphics accelerator. The need to show depth and other attributes drove the development of three dimensional (3-D) graphics accelerators. Devices attached to a display screen typically include a 2-D graphics accelerator and a 3-D graphics accelerator, where the system switches between the two as needed. However, devices now in line to be sold on the market eliminate the 2-D graphics accelerator as a cost savings measure, leaving the 3-D graphics accelerator to perform all the tasks previously performed by the combination of the 2-D graphics accelerator and a 3-D graphics accelerator, including drawing lines.

Conventional lines drawn by a 3-D graphics accelerator typically are composed of two identical elongated triangles with one triangle positioned inverted and adjacent to the other at their bases to form a very long, thin rectangle. Sometimes referred to as triangle quad (quadrilaterals) lines, such straight lines find many uses. For example, the pull-down menus for word processing programs and internet web browser programs typically consist of text bounded by straight lines. The menu options displayed by a cell phone screen may include text bounded by and separated by straight lines. Angled straight lines have many graphical applications, such as to give depth to wire frame drawings of a house or a stack of shelves as presented on a device display screen.

For devices that employ a 3-D graphics accelerator to draw straight lines, the use of triangle quad lines creates problems when digitally representing analog line segments in screen space on a computer screen. For example, the two triangles that make-up the triangle quad line each have three vertices, for a total of six vertices. These six vertices require a lot of memory for storage and a lot of processing time to render all six vertices. A digitally represented triangle quad line may have a thickness where its corresponding analog line required no thickness. In addition, a great deal of processing time is dedicated to rasterizing pixels that will no be rendered as part of the triangle quad line. There is therefore a need in the art for an efficient technique to render a straight line segment utilizing an existing 3-D graphics accelerator.

SUMMARY

Embodiments disclosed herein address the above stated needs by utilizing straight line data as part of particular triangle primitives such that rendering the triangle primitive produces a set of display points that define a two dimensional representation of a straight line graphic object using three dimensional rasterization algorithms.

In one embodiment, a three-dimensional (3D) graphics accelerator may receive data. The data may define three vertices (x0, y0, k0), (x1, y1, K1), and (x2, y2, K2) of a triangle primitive. Attributes K2=(k0+K1)/2 and coordinates (x0, y0), (x1, y1), and (x2, y2) form an isosceles triangle primitive. Coordinates (x0, y0) and (x1, y1) define a base of the isosceles triangle primitive. The isosceles triangle primitive may be rendered using the three dimensional rasterization algorithms to obtain the set of display points that define a two dimensional representation of the base of the isosceles triangle primitive.

DETAILED DESCRIPTION

Figure 1:
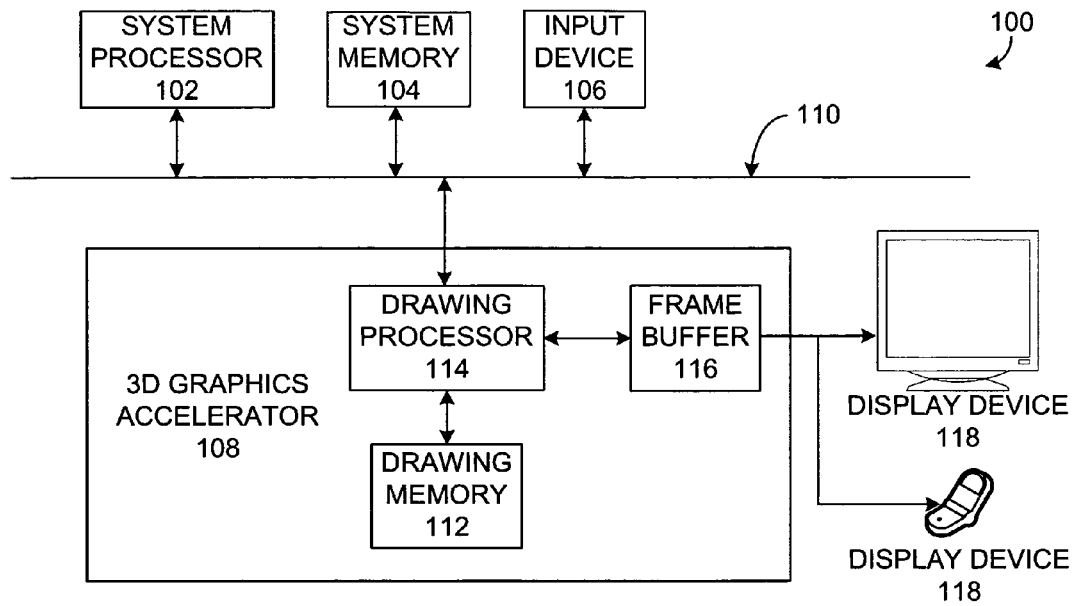
FIG. 1 is a system 100 within which some of the embodiments may be implemented.

FIG. 1 is a system 100 within which some of the embodiments may be implemented. System 100 may include a system processor 102, a system memory 104, an input device 106, such as a keyboard and mouse, and a 3D graphics accelerator 108. Each may communicate through a bus 110.

System processor 102 may be a central processing unit (CPU) of a host computer, such as a desktop or laptop computer, server, gaming console, or cellular telephone. System memory 104 may include various forms of memory resources, such as a permanent storage device, a mass-storage device, a removable storage device, and a volatile read-and-write memory, such as a random access memory (RAM). In conjunction with system memory 104, system processor 102 may process programmed instructions and perform tasks.

3D graphics accelerator 108 may give system 100 the capability to display graphical images quickly and efficiently. For example, 3D graphics accelerator 108 may free up the system processor 102 to execute other commands while 3D graphics accelerator 108 is handling graphics computations. A drawing memory 112, a drawing processor 114, and a frame buffer 116 may be included with 3D graphics accelerator 108 and a display device 118 may be connected to 3D graphics accelerator 108.

Drawing memory 112 may receive data and instructions from system processor 102 and store the data and instructions for use by drawing processor 114. Drawing processor 112 may include components such as an adder, a multiplier, and multiplexers to process the data and instructions within drawing memory 112. During this process, drawing processor 114 may rasterize the data according to the stored instructions. In one embodiment, drawing memory 112 may function as a scratch pad of sorts for color, depth, stencil, etc.

Computer screens and other display screens, such as those used on cell phones, may display images by selectively lighting a grid (or array) of pixels. These bitmap or raster images are completely specified by the set of intensities for the pixel positions in the particular display device screen. A rasterization process may include the conversion of an object-oriented image composed of shapes into a bitmapped image, with each bit designed to light a pixel on display device 118 with a particular intensity. To rasterize the data, drawing processor 114 may load and analyze the data to produce the bitmap, where the bitmap may be stored in frame buffer 116. The bitmap may be a file or image structure representing, bit for bit, an image to be displayed on display device 118. Moreover, frame buffer 116 may be attached directly to bus 110.

Figure 2:
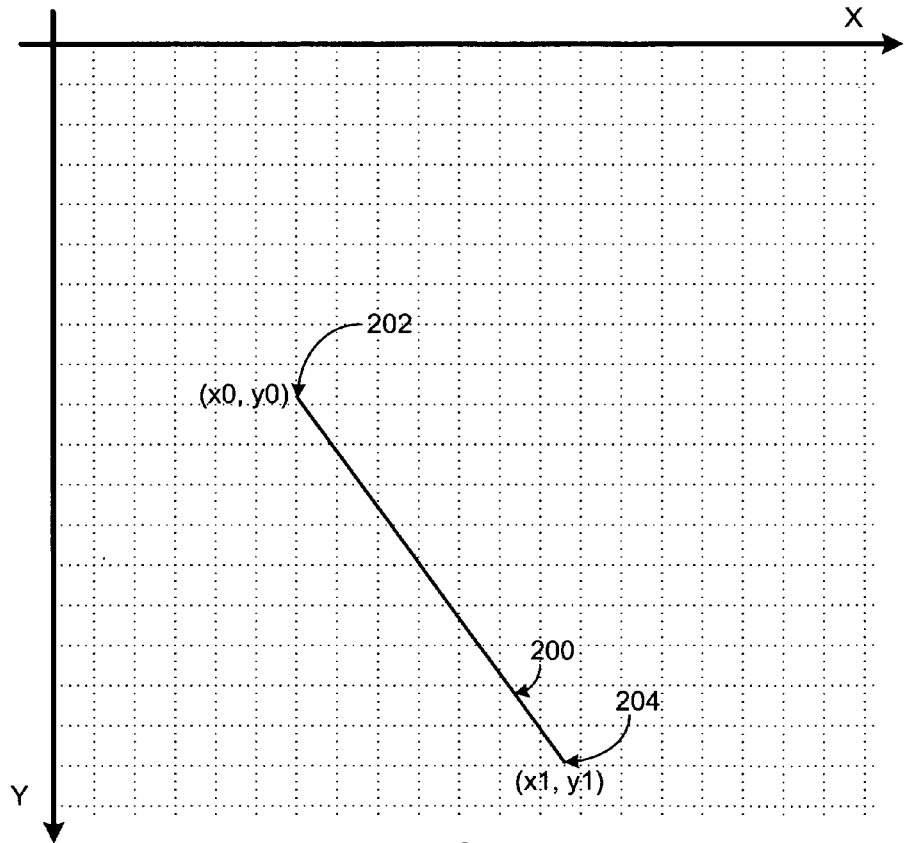
FIG. 2 represents a model space straight line 200 to be drawn as straight line in screen space on display device 118.

FIG. 2 represents a model space straight line 200 to be drawn as straight line in screen space on display device 118. Straight line 200 may extend from a starting point 202 to an ending point 204. Starting point 202 may be designated with the coordinates (x0, y0, z0) and ending point 204 may be designated with the coordinates (x1, y1, z1. Since straight line 200 in this example resides in a plane that is parallel to the screen space on display device 118, starting point 202 is designated with the coordinates (x0, y0) and ending point 204 is designated with the coordinates (x1, y1).

Figure 3:
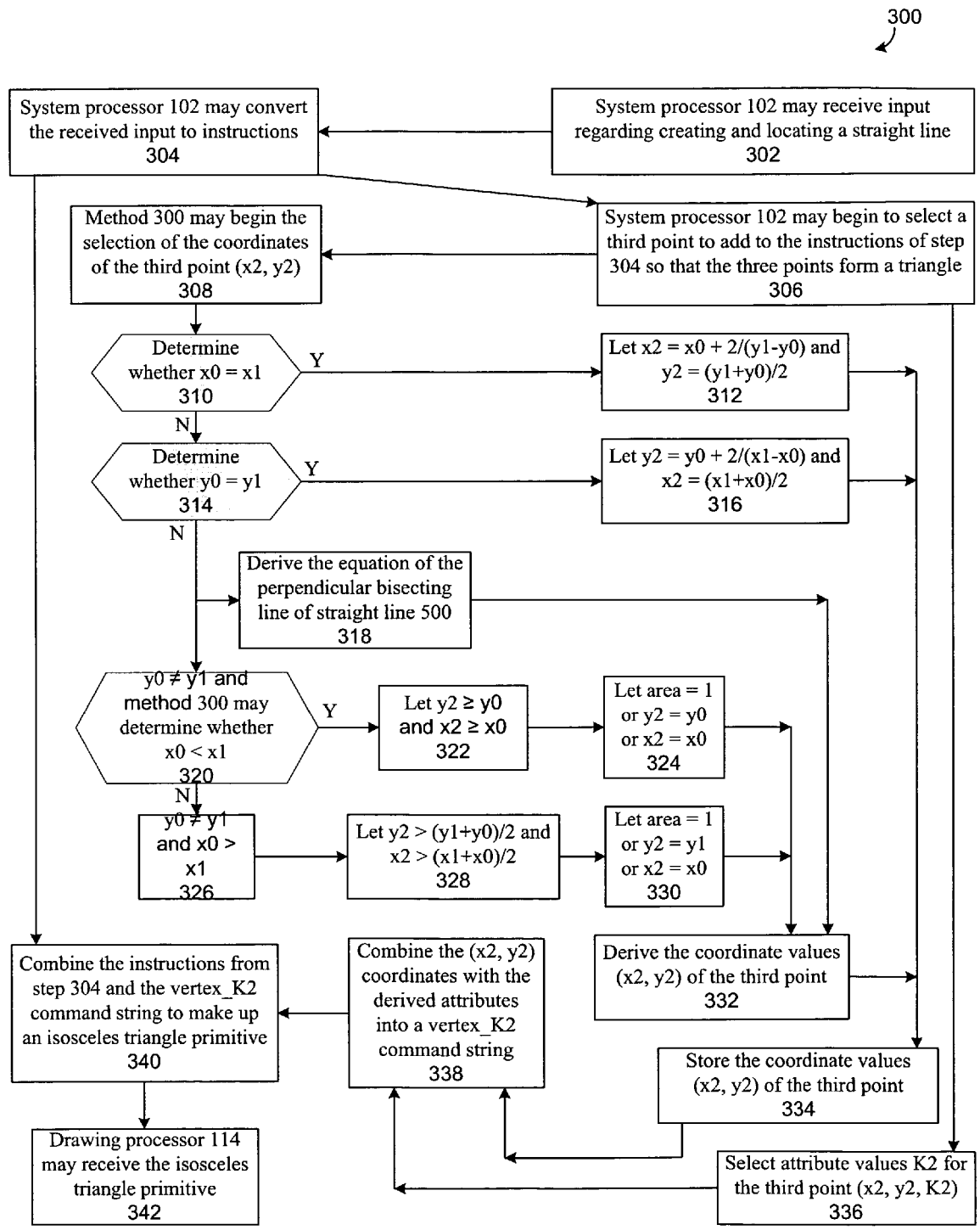
FIG. 3 is a flow chart of a method 300 to construct a triangle primitive from straight line 200.

FIG. 3 is a flow chart of a method 300 to construct a triangle primitive from straight line 200. At step 302, system processor 102 may receive input regarding creating and locating a straight line. The input may come from a human user, such as a person using a computer aided drawing package to draw a wire frame model of an airplane wing, or may come from an application request, such as a request to draw one of the lines for a pull down menu, draw the outline of the back view of a mailing envelope that is to appear on the viewing screen of a cellular phone, or draw one or more lines to appear in a computer game. Either way, input device 106 of FIG. 1 may be used to send input to system processor 102, where the input includes information regarding creating and locating straight line 200.

At step 304, system processor 102 may convert the received input to instructions. The instructions may include a command, such as draw_line, followed by the x, y coordinates of the two endpoints of straight line 200. The starting point of the line may be designated with a zero ("0"), as in (x0, y0), and the ending point of the line may be designated with a one ("1"), as in (x1, y1). A triangle typically is rasterized from a top-left pixel, moving from left to right and then from top to bottom. If the rasterization process reaches the pixel containing the starting point (x0, y0) before reaching any other pixel within the proposed triangle, then the process may determine a location of straight line 200.

To ensure that the first pixel within the proposed triangle is the starting point (x0, y0, the starting point (x0, y0) of straight line 200 may be that end of straight line 200 where y0≧y1 and where x0 is the closest coordinate to the x-axis (where x0≦x1). In other words, the starting point may be that endpoint with the smallest value for the y model space coordinate and, where the two y model space coordinates are equal, the starting point may be that endpoint with the smallest value for the x model space coordinate.

In addition to its location, each endpoint of straight line 200 may be defined by other attributes, such as diffuse colors (alpha ("α"), R, G, B) (e.g., α, red, green, blue), specular colors (RS, GS, BS), texture coordinates (u, v), and fog. Thus, the generic instructions of system processor 102 may appear as command string (1) below:

draw_line(x0,y0,K0,x1,y1 K1)         (1)

or draw_line(x0,y0,n0α,n0R,n0G,n0B,n0RS,n0GS,
n0BS,n0u,n0v, x1,y1,n1α,n1R,n1G,n1B,n1RS,
n1GS,n1BS,n1u,n1v)         (1)

The last digit or characters may identify the particular attribute. The numeric values for the x, y location may be any numbers and the numeric values for the remaining attributes may be from 0 to 255 (e.g., 0 to $2^8$). As a numerical example, the instructions may appear as command string (2) below:

draw_line(1.51,2.21,8α,240R,0G,56B,23RS,0GS,
0BS,4u,256v,3.15,4.48,45α,210R,0G,7B,99RS,
180GS,45BS,0u,16v)         (2)

The straight line to be drawn from command string (2) may be a straight line from the starting point (x0, y0)=(1.51, 2.21) to the ending point (x1, y1)=(3.15, 4.48), with the numeric value of the attributes as specified.

A 2D graphics accelerator may be designed to process command string (2) through vector graphics. However, 3D graphics accelerators process tiny little geometrical objects often called primitives. Quadrilaterals, triangles, n-gons are example of primitives whereas a line is not a primitive. Existing 3D graphics accelerators have not been designed to directly process command string (2).

Where a device lacks a 2D graphics accelerator and includes a 3D graphics accelerator, all the objects seen on the device's screen are actually made of primitives. The border of a primitive is made up of straight line segments. Rasterizing only one line segment of the primitive boarder may produce a straight line. Thus, if information were included with command string (2) to form a primitive, then a 3D graphics accelerator could process the primitive to derive a straight line to fit the straight line of command string (2).

After a review of the various primitives, a triangle primitive appears to be a good candidate for processing into a straight line by 3D graphics accelerator 108. Every 3D object may be split into triangles but a triangle cannot be split into anything else other than a triangle. A triangle in 3D space is also a triangle in 2D space. Since there are less things to deal with, drawing triangles may be a lot simpler than drawing polygons of higher order. These are some reasons why triangles commonly are used in computer graphics.

A triangle has three sides and therefore is composed of three points or vertices. Aside from other information such as color values (or indices) or texture indices, each vertex of the triangle may contain the coordinates of the triangle points. To convert a triangle defined in 3D space to 2D (screen) space, the vertices of a triangle may be projected from 3D to 2D space and then rasterized.

Where a 3D graphics accelerator can only process primitives, a third point may be provided along with the example starting point (1.51, 2.21) and ending point (3.15, 4.48) such that the three points may form a triangle primitive. At 306, system processor 102 may begin to select a third point to add to the instructions of step 304 so that the three points form a triangle.

In rasterizing pixels located within a triangle, the values provided at the vertices of the triangle essentially give a weighted average to each rasterized pixel. For example, the color red calculated (and displayed) at a given pixel may be affected by the distance of the given pixel from each of the three vertices and by the attribute value of diffuse color red (R) at each vertex. The closer a pixel is to a vertex, the greater the red attribute of that vertex may affect that pixel. The further away a pixel is to a vertex, the less the red attribute of that vertex may affect that pixel.

Preferably, the attribute values of the third point are selected so that they will have little to no effect on the calculated attribute values for the pixels along straight line 200. For example, if the attribute values of the third point are selected to be the average of the attribute values of the starting point and ending point of straight line 200, then the attribute values of the third point may have little to no effect on the calculated attribute values for the pixels along straight line 200. In addition, the coordinate value of the third point should be equidistance from the beginning point and endpoint of straight line 200 so that its location may have little to no effect on the calculated attribute values for the pixels along straight line 200.

An isosceles triangle is a triangle with at least two legs of equal length. The vertex formed by the two legs faces a base. The (x2, y2) coordinate of the vertex of an isosceles triangle is equidistance from the beginning point (x0, y0) and endpoint (x1, y1) of the base of the isosceles triangle. Moreover, a line that bisects this vertex passes through the midpoint of the base and is perpendicular to the base. Where such a line originates from the midpoint of the base and extends perpendicularly, it simultaneously bisects the triangle's perimeter and area and may be referred to as a "B-line."

By composing straight line 200 into an isosceles triangle primitive and selecting the attribute values at the vertex (x2, y2) to be the average of the attribute values at the vertex (x0, y0) and vertex (x1, y1), the coordinate and attribute values at the vertex (x2, y2) may have little to no effect on the calculated attribute values for the pixels along straight line 200. If true, a straight line may be drawn by 3D graphics accelerator 108 based on command string (2) by incorporating command string (2) into the noted isosceles triangle. The truth of this may be shown mathematically as follows.

Figure 4:
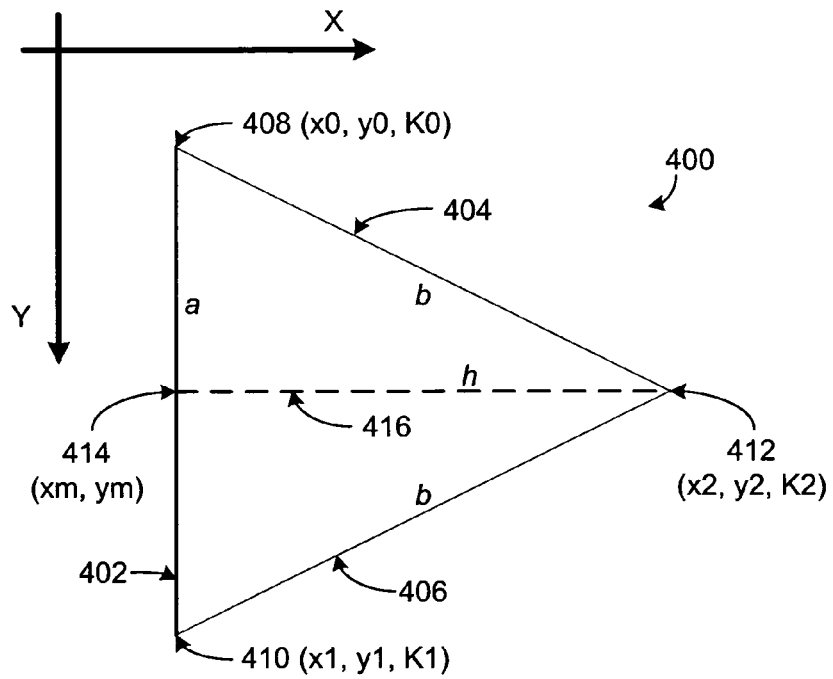
FIG. 4 is plan view of an isosceles triangle 400.

FIG. 4 is plan view of an isosceles triangle 400. Isosceles triangle 400 may include a base 402, a leg 404, and a leg 406, where a length "b" of leg 404 equals a length "b" of leg 406. Isosceles triangle 400 further may include a vertex 408, a vertex 410, and a vertex 412 where vertex 412 may open towards base 402, with base 402 having a length "a." A midpoint (xm, ym) 414 may reside exactly halfway along length "a," between vertex 408 and vertex 410. Moreover, a B-line 416 may extend from midpoint 414 along a height "h" to vertex 412. In the example of FIG. 4, base 402 may be the straight line segment to be rendered by 3D graphics accelerator 108 and displayed on display device 118.

Each pixel located within isosceles triangle 400 may have attributes K, including attributes $\alpha$, R, G, B, RS, GS, BS, u, and v. The values of attributes at each of vertex 408, vertex 410, and vertex 412 may be represented by K0, K1, and K2, respectively. Thus, inside isosceles triangle 400, there is a linear bivariate function K of the x, y location in screen space such that $$K(x,y) = (Ak)(x) + (Bk)(y) + Ck \quad (3)$$

where

K=$\alpha$, R, G, B, RS, GS, BS, u, and v;

(x, y) represent a screen space coordinate for one screen pixel; and

Ak, Bk, and Ck represent linear coefficients.

The linear coefficients Ak, Bk, and Ck for a given x, y screen space coordinate may be obtained by equations associated with vertex 408, 410, and 412. By employing rasterization algorithms and determining the linear coefficients Ak, Bk, and Ck for a given x, y screen space coordinate, the value of the particular pixel attribute may be obtained at the corresponding x, y screen space coordinate according to equation (3).

Equations associated with vertex 408, 410, and 412 for linear coefficients Ak, Bk, and Ck include the following:

$$Ak = [(A0)(K0) + (A1)(K1) + (A2)(K2)]/\text{Area} \quad (4)$$

$$Bk = [(B0)(K0) + (B1)(K1) + (B2)(K2)]/\text{Area} \quad (5)$$

$$Ck = [(C0)(K0) + (C1)(K1) + (C2)(K2)]/\text{Area} \quad (6)$$

where the area for an isosceles triangle is $$\text{Area} = (1/2)(a)(h) = (1/2)(a)[(b^2) - (1/4)(a^2)]^{(1/2)} \quad (7)$$

and where the linear coefficients may be expressed as $$A0 = y1 - y2 \quad A1 = y2 - y0 \quad A2 = y0 - y1 \quad (8)$$

$$B0 = x2 - x1 \quad B1 = x0 - x2 \quad B2 = x1 - x0 \quad (9)$$

$$C0 = (x1)(y2) - (x2)(y1) \quad C1 = (x2)(y0) - (x0)(y2) \quad C2 = (x0)(y1) - (x1)(y0) \quad (10)$$

Three dimensional rasterization algorithms include equations (3), (4), (5), and (6). As discussed above, if the attribute values for K2 (e.g., the attribute values for the third point) are selected to be the average of the attribute values for K0 and K1, then the attribute values of K2 may have little to no effect on the calculated attribute values K(x, y) for the pixels along base 402. Mathematically, this may be expressed as:

$$K2 = (K0 + K1)/2 \quad (11)$$

Since the triangle selected for rendering is an isosceles triangle, the value of y2 in equations (8), (9), and (10) may be expressed in terms of y0 and y1. By orienting isosceles triangle 400 so that x0=x1 as in FIG. 4, y2 may be expressed simply as:

$$y2 = (y0 + y1)/2 \quad (12)$$

As noted above, $$Ak = [(A0)(K0) + (A1)(K1) + (A2)(K2)]/\text{Area} \quad (4)$$

substituting equation (8) into equation (4), $$Ak=[(y1-y2)(K0)+(y2-y0)(K1)+(y0-y1)(K2)]/\text{Area} \quad (13)$$

substituting equation (11) into equation (13), $$Ak=[(y1-y2)(K0)+(y2-y0)(K1)+(y0-y1)((K0+K1)/2)]/\text{Area} \quad (14)$$

substituting equation (12) into equation (14), $$Ak=[(y1-(y0+y1)/2)(K0)+((y0+y1)/2-y0)(K1)+(y0-y1)((K0+K1)/2)]/\text{Area} \quad (15)$$

multiplying and dividing through results in $$Ak=[(K0)(y1)-0.5(K0)(y0)-0.5(K0)(y1)+0.5(K1)(y0)+\\0.5(K1)(y1)-(K1)(y0)+0.5(K0)(y0)-0.5(K0)(y1)+\\0.5(K1)(y0)-0.5(K1)(y1)]/\text{Area} \quad (16)$$

rearranging, $$Ak=[-0.5(K0)(y0)+0.5(K0)(y0)+(K0)(y1)-0.5(K0)\\(y1)-0.5(K0)(y1)+0.5(K1)(y0)-(K1)(y0)+0.5(K1)\\(y0)+0.5(K1)(y1)-0.5(K1)(y1)]/\text{Area} \quad (17)$$

or $$Ak=[0]/\text{Area}=0 \quad (18)$$

As noted above, $$K(x,y)=(Ak)(x)+(Bk)(y)+Ck \quad (3)$$

substituting equation (18) into equation (3), $$K(x,y)=(0)(x)+(Bk)(y)+Ck \quad (19)$$

or, $$K(x,y)=(Bk)(y)+Ck \quad (20)$$

By utilizing an isosceles triangle and setting the value of K2 equal to the average value of K0 and K1, the quantity (Ak)(x) drops out of equation (3) to make the value of K(x, y) a univariate function of y only, as in equation (20). This is the desired result: neither the distance of (x2, y2) from (x0, y0) or (x1, y1) nor the attribute values of K2 affect the attribute values along base 402, the straight line segment selected to be drawn.

As noted above, system processor 102 may begin to select a third point at step 306 to add to the instructions of step 304 so that the three points form a triangle.

With the starting point (x0, y0)=(1.51, 2.21) and the ending point (x1, y1)=(3.15, 4.48) of straight line 200 as from command string (2), the midpoint of straight line 200, (xm, ym) is $$(xm,ym)=((x1+x0)/2,(y1+y0)/2) \quad (21)$$

$$(xm,ym)=(2.33,3.35)=((1.51+3.15)/2,(2.21+4.48)/2).$$

Using slope of a line equation, the starting point (1.51, 2.21), and the ending point (3.15, 4.48), the slope of straight line 200 is $$m=(y1-y0)/(x1-x0) \quad (22)$$

$$1.38=(2.21-4.48)/(1.51-3.15)$$

To find the y-intercept "b" of straight line 200, the general line equation may be used:

$$y=mx+b \text{ or } b=y-mx \quad (23)$$

$$b=2.21-1.38(1.51)$$

$$b=0.12$$

With the slope m=1.38, the line equation of straight line 200 is $$y=1.38x+0.12 \quad (24)$$

The length of straight line 200 (distance of the base) is $$\text{distance}=[(x1-x0)^2+(y1-y0)^2]^{(1/2)} \quad (25)$$

$$2.80=((1.51-3.15)^2+(2.21-4.48)^2)^{(1/2)}$$

The slope m of a perpendicular line passing through the midpoint of straight line 200 is the negative inverse of the slope of straight line 200, here m=1.38. Thus, the slope m of a perpendicular line passing through the midpoint of straight line 200 is −0.72 (=−(1/1.38)). The y-intercept of a perpendicular line passing through the midpoint of straight line 200 may be found from equation (23) such that 3.35=(−0.072)(2.33)+b, or b=5.03. Thus, the third point (x2, y2) may be a point along a line with the equation:

$$y2=-0.72(x2)+5.03 \quad (26)$$

Figure 5:
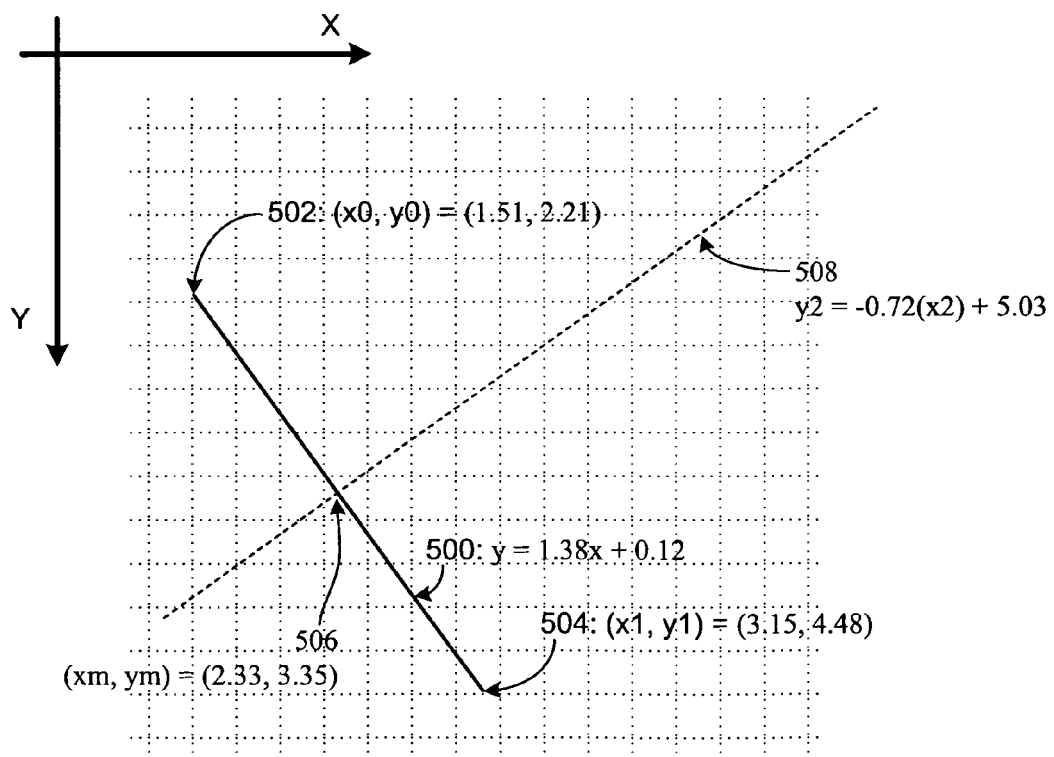
FIG. 5 is a plan view of straight line 200 redrawn as straight line 500.

FIG. 5 is a plan view of straight line 200 redrawn as straight line 500. Straight line 500 resides between starting point 502 and ending point 504 and contains midpoint 506 (xm, ym). Line 508 is positioned through midpoint 504 as a perpendicular bisector of straight line 200. As noted above, the third point (x2, y2) may be a point along a line according to equation (26): y2=−0.72(x2)+5.03. In addition, where rasterization starts in a right to left then top to bottom direction from the upper left corner of display device 118 of FIG. 1, it may be desirable to allow the rasterization process to determine a location of straight line 500. One way to determine where starting point 502 of straight line 500 resides is to choose the third point along line 508 such that the first pixel identified by the rasterization process as being inside the planned isosceles triangle is that pixel associated with the (x0, y0) start point of straight line 500, namely point 502.

Figure 6A:
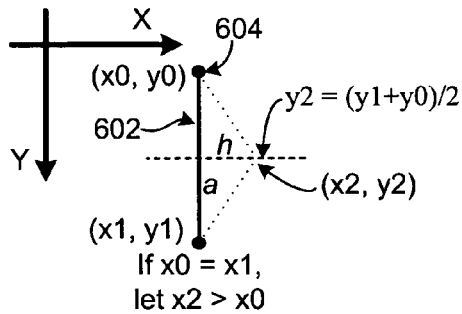
FIG. 6A is a plan view of straight line 602 in a vertical position.
Figure 6B:
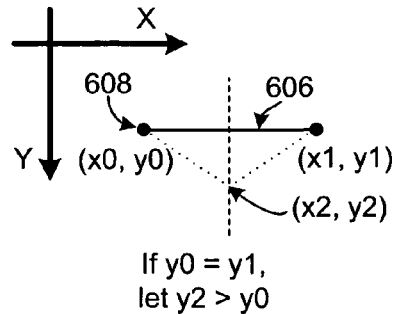
FIG. 6B is a plan view of straight line 606 in a horizontal position.
Figure 6C:
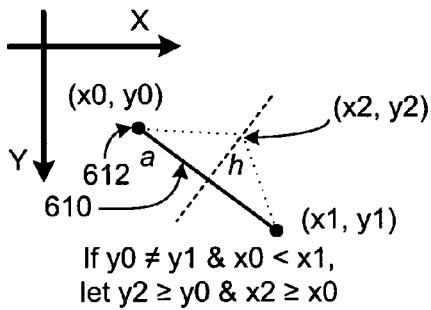
FIG. 6C is a plan view of straight line 610 in a position that slopes down and to the right.
Figure 6D:
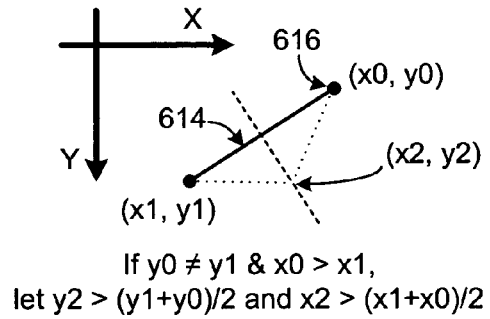
FIG. 6D is a plan view of straight line 612 in a position that slopes down and to the left.

FIGS. 6A, 6B, 6C, and 6D illustrate the four possible arrangements at which a straight line to be rendered may be positioned. FIG. 6A is a plan view of straight line 602 in a vertical position. FIG. 6B is a plan view of straight line 606 in a horizontal position. FIG. 6C is a plan view of straight line 610 in a position that slopes down and to the right. FIG. 6D is a plan view of straight line 612 in a position that slopes down and to the left.

In FIG. 6A, the x coordinate of the starting point (x0, y0) and the x coordinate of the ending point (x1, y1) of straight line 602 are equal (namely, x0=x1). Here, an isosceles triangle may be formed if y2 is positioned along a line that perpendicularly bisects straight line 602, namely where y2=(y1+y0)/2. Moreover, if x2 is greater than the value of the x coordinates of the starting point (x0, y0) of straight line 602, then the left to right, top to bottom rasterization process will first reach that pixel associated with the starting point (x0, y0) (point 604 in FIG. 6A) before reaching any other pixel inside the proposed isosceles triangle.

Because the rasterization process requires an area to work, x2≠x0 as the following establishes. In FIG. 6A, x0=x1. If x2=x0, then x0=x1=x2, thereby presenting a straight line to 3D graphics accelerator 108 to process. 3D graphics accelerator 108, which processes triangles, cannot process such a straight line for the following reason. If x2=x0, then x0=x1=x2 and area of the triangle primitive would equal zero (namely, h=0). If the area is zero, then this would result in a divide by zero error for equations (4), (5), and (6) and thus would prevent any rendering of the straight line. Thus, x2≠x0.

There may be circumstances where x2 may be less than the value of the x coordinates of the starting point (x0, y0) of straight line 602 that will permit the rasterization process to first reach that pixel associated with the starting point (x0, y0) (starting point 604 of FIG. 6A) before reaching any other pixel inside the proposed isosceles triangle. However, the determination of permissible x2 values for x2<x0 may require additional computation time and processor time. Thus, x2 preferably is greater than x0 (namely, x2>x0) as part of the selection of the third point in scenario having a straight line as in FIG. 6A.

The selection of the third point in scenario having a straight line as in FIG. 6A may be refined further. If the x2 coordinate of the third point is selected to make the area computation of equations (4), (5), and (6) relatively simple, then this may save on processing time and thus save on power consumption. From equation (7) above, the area of an isosceles triangle is $$\text{Area}=(\tfrac{1}{2})(a)(h) \tag{7}$$

where "a" may be the length of straight line 602 and h may be the length of the B-line extending from the midpoint of straight line 602 to the third point. If h were set equal to 2/a, then the area would=1.00. Thus, one way to save power may be to set the area equal to 1 without actually computing the area.

The length "a" of straight line 602 of FIG. 6A is equal to y1−y0. Moreover, the height "h" of the proposed isosceles triangle of FIG. 6A is equal to x2−x0. In other words, let $$h=2/a \tag{27}$$

so that, $$x2-x0=2/(y1-y0) \tag{28}$$

or, $$x2=x0+2/(y1-y0) \tag{29}$$

In summary of the above

If x0=x1, then let $x2=x0+2/(y1-y0)$ and $y2=(y1+y0)/2$ (30)

In FIG. 6B, the y coordinate of the starting point (x0, y0) and the y coordinate of the ending point (x1, y1) of straight line 602 are equal (or, y0=y1). Here, an isosceles triangle may be formed if x2 is positioned along a line that perpendicularly bisects straight line 602, namely x2=(x1+x0)/2. Moreover, if y2 is greater than the value of the y coordinates of the starting point (x0, y0) of straight line 602, then a left to right, top to bottom rasterization process will first reach that pixel associated with the starting point (x0, y0) (point 608 in FIG. 6B) before reaching any other pixel inside the proposed isosceles triangle. Along the same logic as employed for FIG. 6A, If y0=y1, then let $y2=y0+2/(x1-x0)$ and $x2=(x1+x0)/2$ (31)

In FIG. 6C, the y coordinate of the starting point (x0, y0) and the y coordinate of the ending point (x1, y1) of straight line 610 are not equal (or, y0≠y1). In addition, x0<x1. Similar to FIG. 6A and FIG. 6B, an isosceles triangle may be formed if the third point (x2, y2) is positioned along a line that perpendicularly bisects straight line 610. To ensure that the pixel containing point 612 of FIG. 6C is rasterized first before any other pixel, y2 should not be smaller than y0 and x2 should not be smaller than x0. In other words, If y0≠y1 & x0<x1, let y2≧y0 and x2≧x0

It may be desirable to make the area of the isosceles triangle proposed for a straight line as arranged in FIG. 6C relatively simple to calculate as a way of saving power. From equation (27), this may mean that $$h=2/a \tag{27}$$

Straight line 500 of FIG. 5 fits the straight line scenario of FIG. 6C and serves as a good example to explore this proposal.

Recall that the length "a" of straight line 200 (straight line 500) was calculated from equation (25) as 2.80. If h=2/(2.80), then the area of such an isosceles triangle would have a value of one. Moreover, from equation (24), straight line 500 is defined by the line equation y=1.38x+0.12 and the perpendicular bisecting line 508 of straight line 500 is defined by the line equation y2=−0.72(x2)+5.03 from equation (26).

With h=2/(2.80), the line equation y2=−0.72(x2)+5.03, and one point on the perpendicular line passing through the midpoint of straight line 500 being (2.33, 3.35)=(xm, ym) (see FIG. 5), (x2, y2) may be found by employing equation (25), rewritten as $$h=[(x2-xm)^2+(y2-ym)^2)]^{(1/2)} \tag{33}$$

$$2/(2.80)=[(x2-2.33)^2+(y2-3.35)^2)]^{(1/2)} \tag{34}$$

With $$y2=-0.72x2+5.03$$

substituted into equation (34), $$(2/(2.80))^2=(x2-2.33)^2+((-0.72x2+5.03)-3.35)^2$$

$$0.51=(x2-2.33)^2+((-0.72x2+1.68)^2$$

$$0.51=[(x2)^2-4.66x2+5.43]+[0.52(x2)^2-2.42x2+2.82]$$

$$0.51=1.52(x2)^2-7.08x2+8.25$$

$$0=1.52(x2)^2-7.08x2+7.74$$

Dividing both sides by 1.52, $$0=(x2)^2-4.66x2+5.09$$

and factoring this polynomial with integers, the following is obtained:

$$0=(x2-2.91)(x2-1.75)$$

$$x2=2.91 \text{ or } x2=1.75$$

Recall that x2≧x0 for a straight line arranged as in FIG. 6C. For straight line 500 of FIG. 5, x0=1.51. Thus, in this case, x2 may be either 2.91 or 1.75. If x2 is set equal to 2.91 (x2=2.91), y2=2.93=−0.72(2.91)+5.03 so that $$(x2, y2)=(2.33, 2.93) \tag{35}$$

An alternate way to save computational power is to let x2=x0 or y2=y0 for the arrangement in FIG. 6C. For straight line 200 in FIG. 5 with y2=y0, x2 could then simply be calculated from the equation of line 508 as follows:

$$y2=2.21=-0.72x2+5.03$$

$$x2=3.90=(2.21-5.03)/(-0.72)$$

so that $$(x2,y2)=(3.90,2.21)$$

A tradeoff for a simple calculation of the third point coordinates (x2, y2) for the arrangement needed in FIG. 6C is that there may be more computations needed to determine the area of the isosceles triangle of FIG. 6C. With regard to FIG. 6C, the above may be summarized as If y0≠y1 and x0<x1, let y2≧y0 and x2≧x0 and let
(area=1 or y2=y0 or x2=x0)     (36)

Figure 7:
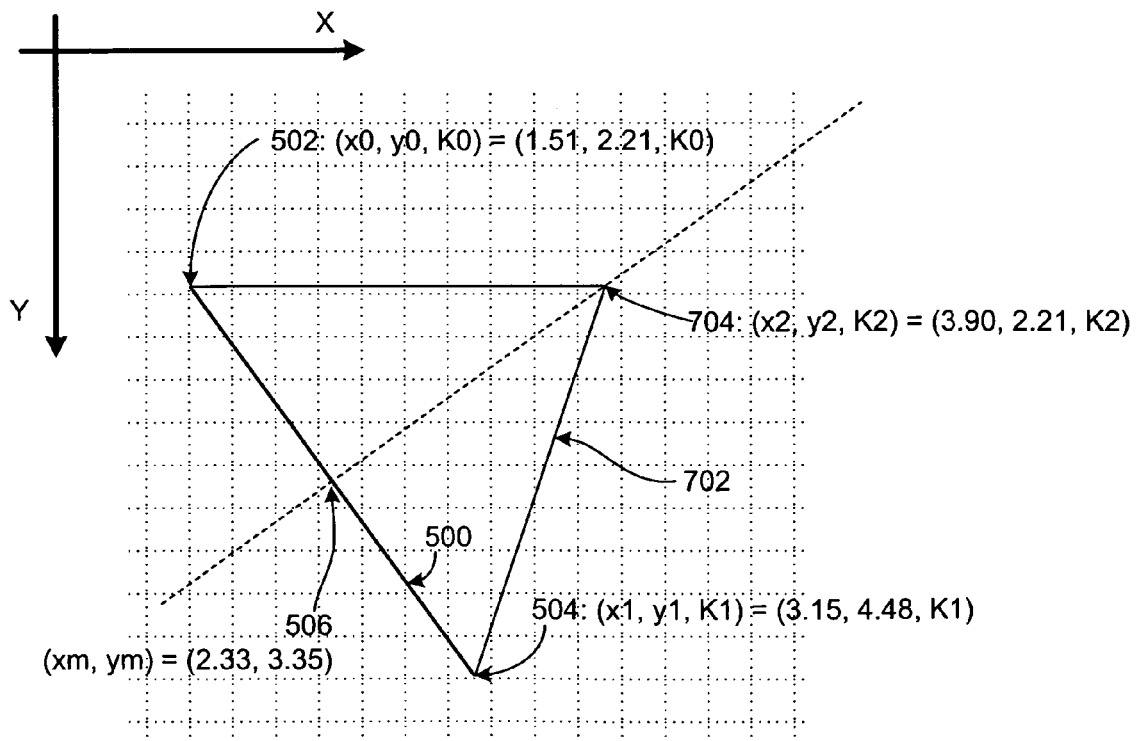
FIG. 7 is a plan view of an isosceles triangle 702 drawn with third point 704 set at (x2, y2)=(3.90, 2.21)

FIG. 7 is a plan view of an isosceles triangle 702 drawn with third point 704 set at (x2, y2)=(3.90, 2.21). Isosceles triangle 702 includes straight line 500 between beginning point 502 and ending point 504.

In FIG. 6D, the y coordinate of the starting point (x0, y0) and the y coordinate of the ending point (x1, y1) of straight line 610 are not equal (or, y0≠y1). In addition, x0>x1. Similar to FIG. 6C, an isosceles triangle may be formed if the third point (x2, y2) is positioned along a line that perpendicularly bisects straight line 614. To ensure that the pixel containing point 616 of FIG. 6D is rasterized first before any other pixel, y2 should be greater than ym and x2 should be greater than xm. In other words, If y0≠y1 and x0>x1, let $y2>(y1+y0)/2$ and $x2>(x1+x0)/2$     (37)

A similar choice in saving computational power as in a FIG. 6C straight line may be made for the processing of a FIG. 6D straight line. In addition to equation (37), setting the area equal to one (area=1) may ease the computation load on the processor that calculates the area but may increase the computation load on the processor that determines the coordinates of the third point (x2, y2). Alternatively, setting x2=x0 or setting y2=y1 in addition to equation (37) may ease the computation load on the processor that calculates the coordinates of the third point (x2, y2), but may increase the computation load on the processor that calculates the area. This may be summarized as If y0≠y1 and x0>x1, let $y2>(y1+y0)/2$ and $x2>(x1+x0)/2$ and let (area=1 or y2=y1 or x2=x0)     (38)

Typically, system processor 102 of FIG. 1 may determine both the coordinates of the third point (x2, y2) for that triangle primitive and the area of a triangle primitive. One system processor may be more efficient in calculating triangle primitive area than calculating the coordinates of the third point of the triangle primitive and such an efficiency may be exploited by letting area=1 be the default for equation (38). If system processor 102 receives input at step 302 to create and locate three lines where y0≠y1 and x0>x1, system processor 102 may be programmed to let area=1 for the first line, y2=y1 for the second line, and x2=x0 for the third line. In this way, system processor 102 may utilize more processing circuits than if area=1 for all three lines.

The equations for FIGS. 6A through 6D may be summarized to include the following equations for the selection of the third point (x2, y2):

If x0=x1, then let $x2=x0+2/(y1-y0)$ and $y2=(y1+y0)/2$     (30)

If y0=y1, then let $y2=y0+2/(x1-x0)$ and $x2=(x1+x0)/2$     (31)

If y0≠y1 and x0<x1, let y2≧y0 and x2≧x0 and let (area=1 or y2=y0 or x2=x0)     (36)

If y0≠y1 and x0>x1, let $y2>(y1+y0)/2$ and $x2>(x1+x0)/2$ and let (area=1 or y2=y1 or x2=x0)     (38)

Recall that system processor 102 may begin to select a third point at step 306 in method 300 of FIG. 3 to add to the instructions of step 304 so that the three points form a triangle. At 308, method 300 may begin the selection of the coordinates of the third point (x2, y2).

Equations (30), (31), (36), and (38) may be utilized in the selection of the coordinates of the third point (x2, y2). At 310, method 300 may determine whether x0=x1. If x0=x1, then method 300 may let x2=x0+2/(y1−y0) and y2=(y1+y0)/2 at step 312. If x0≠x1, method 300 may determine at step 314 whether y0=y1. If y0=y1, then method 300 may let y2=y0+2/(x1−x0) and x2=(x1+x0)/2 at step 316. If y0≠y1, method 300 may proceed to step 318 and derive the equation of the perpendicular bisecting line of straight line 500. Method 300 also may proceed from step 314 to step 320.

At step 320, y0≠y1 and method 300 may determine whether x0<x1. If x0<x1 at step 320, then method 300 may let y2≧y0 and x2≧x0 at step 322. At 324, method 300 further may let area=1 or y2=y0 or x2=x0. If x0 is not less than x1 at step 320, then method 300 may proceed to step 326. At 326, y0≠y1 and x0>x1. At step 328, method 300 may let y2>(y1+y0)/2 and x2>(x1+x0)/2. At 330, method 300 may let area=1 or y2=y1 or x2=x0.

From step 318, step 324, and step 330, method 300 may proceed to step 332. At step 332, method 300 may employ the line equation derived in step 318 and the appropriate input from 324 or 330 to derive the coordinate values (x2, y2) of the third point. From step 312, step 316, and step 332, method 300 may proceed to step 334. At step 334, method 300 may store the coordinate values (x2, y2) of the third point.

In addition to proceeding from step 306 to begin the selection of the coordinates of the third point (x2, y2) at step 308, method 300 also may proceed from step 306 to step 336. At step 336, method 300 may select attribute values K2 for the third point (x2, y2, K2). Method 300 may select attribute values K2 for the third point (x2, y2, K2) so that the selected attribute values may have little to no effect on the calculated attribute values for the pixels along straight line 200. For example, to determine the attributes K2 to be assigned to the vertex (x2, y2), the average value of each attribute of the command string (2) and equation (11) may be utilized.

draw_line(x0,y0,K0,x1,y1 K1)     (1)

draw_line(1.51,2.21,8α,240R,0G,56B,23RS,0GS, 0BS,4u,256v, 3.15,4.48,45α,210R,0G,7B,99RS, 180GS,45BS,0u,16v)     (2)

$K2=(K0+K1)/2$     (11)

The diffuse color alpha ("α") average value from command string (2) is 26.5 (=(8+45)/2). The diffuse color red ("R") average value from command string (2) is 275 (=(240+210)/2). The diffuse color green ("G") average value from command string (2) is 0 (=(0+0)/2). By employing the coordinates from equation (35) and calculating the remaining attributes and, the vertex command string for the third point (K2) may be:

vertex_K2(3.90,2.21,26.5α,275R,0G,31.5B,61RS, 90GS,22.5BS,2u,136v)     (39)

In an alternative embodiment, if system processor 102 received at step 302 information that defined a triangle (x0, y0, K0), (x1, y1, K1), (x2', y2', K2') and a request to render an edge of the triangle into a straight line, then the K2' attribute values could be adjusted to derive K2 such that K2=(K0+K1)/2.

At step 338, method 300 may combine the (x2, y2) coordinates from step 334 with the derived attributes K2 from step 336 into a vertex_K2 command string. Together, command string (2) and command string (39) make up isosceles triangle 702 of FIG. 7. At step 340, method 300 may combine the instructions from step 304 and the vertex_K2 command string to make up an isosceles triangle primitive. At step 342, drawing processor 114 may receive isosceles triangle primitive 702.

Figure 8:
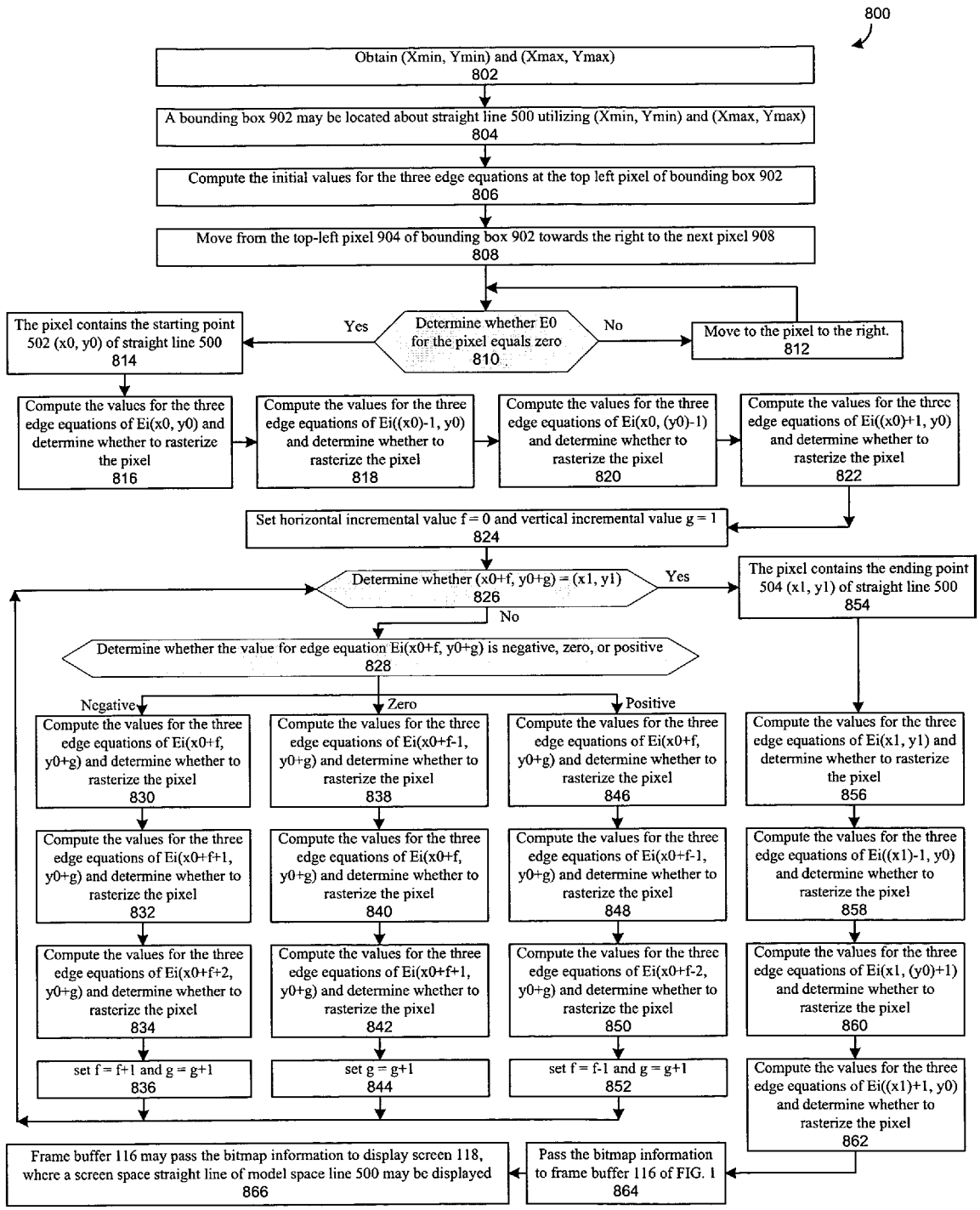
FIG. 8 is a method 800 to develop isosceles triangle primitive 702.

FIG. 8 is a method 800 to develop isosceles triangle primitive 702. A bounding box algorithm may be employed to render isosceles triangle primitive 702 of FIG. 7. A bounding box 902 may be located about straight line 500. Bounding box 902 may be located by getting (Xmin, Ymin) and (Xmax, Ymax) based on the location of starting point 502 and ending point 504 of straight line 500. (Xmin, Ymin) and (Xmax, Ymax) may be the rounded scaled integers of (x0, y0) and (x1, y1). At 802, method 800 may obtain (Xmin, Ymin) and (Xmax, Ymax). At 804, a bounding box 902 may be located about straight line 500 utilizing (Xmin, Ymin) and (Xmax, Ymax).

Figure 9:
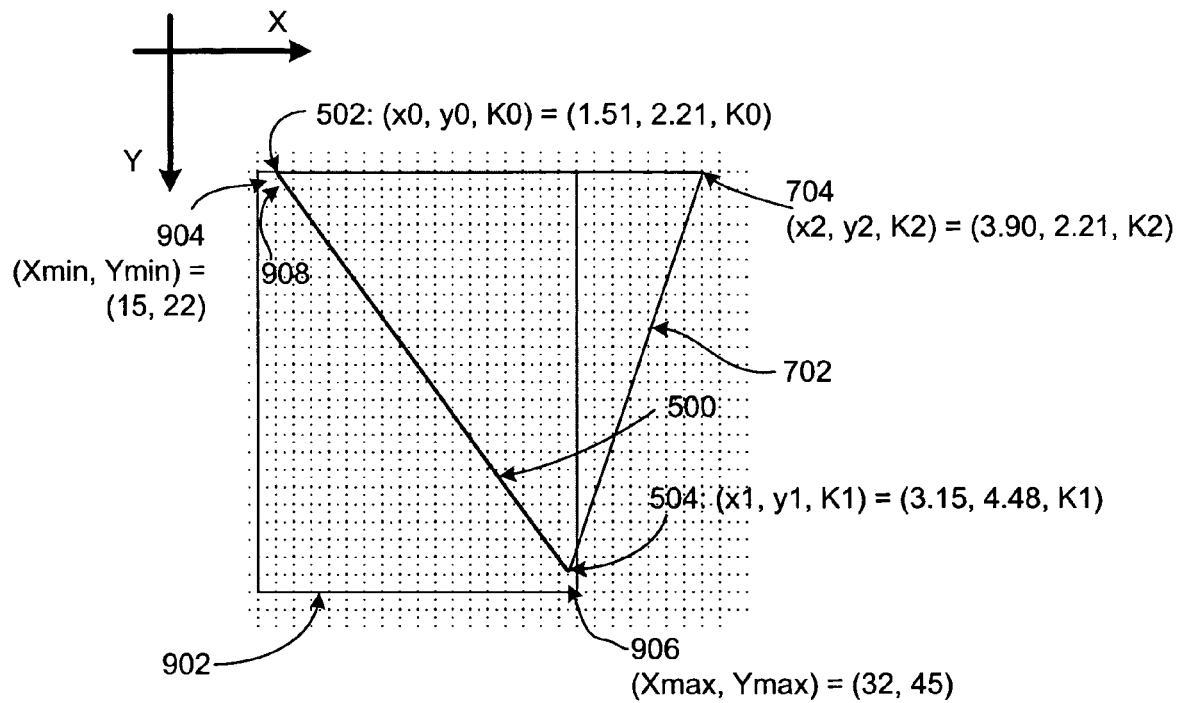
FIG. 9 is plan view of triangle 702 with bounding box 902 located about straight line 500.

FIG. 9 is plan view of triangle 702 with bounding box 902 located about straight line 500. Rounding the minimum and maximum values for x and y and scaling the model space coordinates to the screen space coordinates, results in bounding box 902 being located at (Xmin, Ymin) (=(15, 22)) 904 and (Xmax, Ymax) (=(32, 45)) 906.

Rendering straight line 500 of FIG. 9 essentially is an interpolation process that may illuminate those pixels through which straight line 500 may pass. However, rounding the model space coordinate values to screen space integers causes straight lines to be displayed with a stair step appearance (sometimes referred to as "the jaggies"), particularly on low-resolution display screens, such as cell phone screens having relatively few pixels. Thus, it may be important to illuminate pixels near those pixels through which straight line 500 may pass to provide shading or blending that minimizes the jaggies.

Inside isosceles triangle 702 of FIG. 9, there is a linear function K of the x, y location in screen space such that $$K(x,y)=(Ak)(x)+(Bk)(y)+Ck \quad (3)$$

where

K=α, R, G, B, RS, GS, BS, u, and v;

(x, y) represent a screen space coordinate for one screen pixel; and

Ak, Bk, and Ck represent linear coefficients.

The linear coefficients, A, B, C may be obtained by equations (4), (5), and (6), which are associated with the three vertices 502, 504, and 704. By deriving the coefficients A, B, C, the attribute's value may be obtained at any desired screen space (x, y) location according to equation (3).

Directly evaluating every attribute value per pixel based on equation (3) may require two multipliers and two adders, which is a very expensive solution. Preferably, a bounding box based algorithm may be used to render pixels neat straight line 500 with only add ("+") operations. One bounding box based algorithm that employs only add operations utilizes edge equations. The three edges of a triangle may be represented by planer (affine) functions that are negative to the left of the edge, positive to the right of the edge, and zero on the edge:

$$E0(x,y)=(A0)(x)+(B0)(y)+C0 \quad (39)$$

$$E1(x,y)=(A1)(x)+(B1)(y)+C1 \quad (40)$$

$$E2(x,y)=(A2)(x)+(B2)(y)+C2 \quad (41)$$

The above three equations (39), (40), and (41) require six multiply and six add operations, which is very expensive. By evaluating the point (x+1, y) minus the point (x, y) for each of equations (39), (40), and (41), the resulting equation uses only add operations. For example, for equation (39):

$$\begin{aligned}E0(x+1, y) &= (A0)(x) + (A0) + (B0)(y) + C0 \\ -E0(x, y) &= -(A0)(x) \qquad - (B0)(y) - C0 \\ \hline E0(x+1, y) - E0(x, y) &= A0\end{aligned} \quad (42)$$

An equation for B0 similarly may be obtained:

$$E0(x,y+1)-E0(x,y)=B0 \quad (43)$$

In other words, once the initial edge functions E0, E1, E2 is determined for the pixel (Xmin, Ymin), then the edge function for the next pixel to the right on the same horizontal scan-line in the +x direction may be obtained by adding A0 or the edge function for the next pixel below on the same vertical line in the +y direction may be obtained by adding B0:

$$Ei(X\text{min},Y\text{min})=(Ai)(X\text{min})+(Bi)(Y\text{min})+C0, \text{ where } (i=0,1,2) \quad (44)$$

and $$Ei(X\text{min}+1,Y\text{min})=Ei+A0, \text{ where } (i=0,1,2) \quad (45)$$

$$Ei(X\text{min},Y\text{min}+1)=Ei+B0, \text{ where } (i=0,1,2) \quad (46)$$

The rendering process may also move to the left or up through the additive equations:

$$Ei(X\text{min}-1,Y\text{min})=Ei-A0, \text{ where } (i=0,1,2) \quad (47)$$

$$Ei(X\text{min},Y\text{min}-1)=Ei-B0, \text{ where } (i=0,1,2) \quad (48)$$

Returning to method 800, method 800 may compute at step 806 the initial values for the three edge equations at the top left pixel of bounding box 902. In the present example, the top left pixel of bounding box 902 is pixel 904. Equation (44) may be employed to compute the initial values for the three edge equations at pixel 904.

At step 808, method 800 may move from the top-left pixel 904 of bounding box 902 towards the right to the next pixel 908. At 810, method 800 may determine whether E0 for the pixel equals zero. If E0 for that pixel is not zero, then method 800 may move at step 812 to the pixel to the right and return to step 810.

Recall that the E0 edge of a triangle may be represented by planer (affine) function that is zero on the edge. If E0=0, then method 800 has reached the pixel that contains (x0, y0). If E0 for that pixel is equal to zero, then method 800 may conclude at step 814 that the pixel contains the starting point 502 (x0, y0) of straight line 500. At step 816, method 800 may determine whether to rasterize the pixel.

Not all pixels will give illumination to straight line 500. Some pixels may provide shading or blending and other pixels may provide a direct indication of straight line 500. However, the majority of pixels within bounding box 902 most likely will not give any illumination to straight line 500 and thus will not be rasterized. By skipping pixel within bounding box 902, the speed at which straight line 500 may be rendered may be increased.

Figure 10:
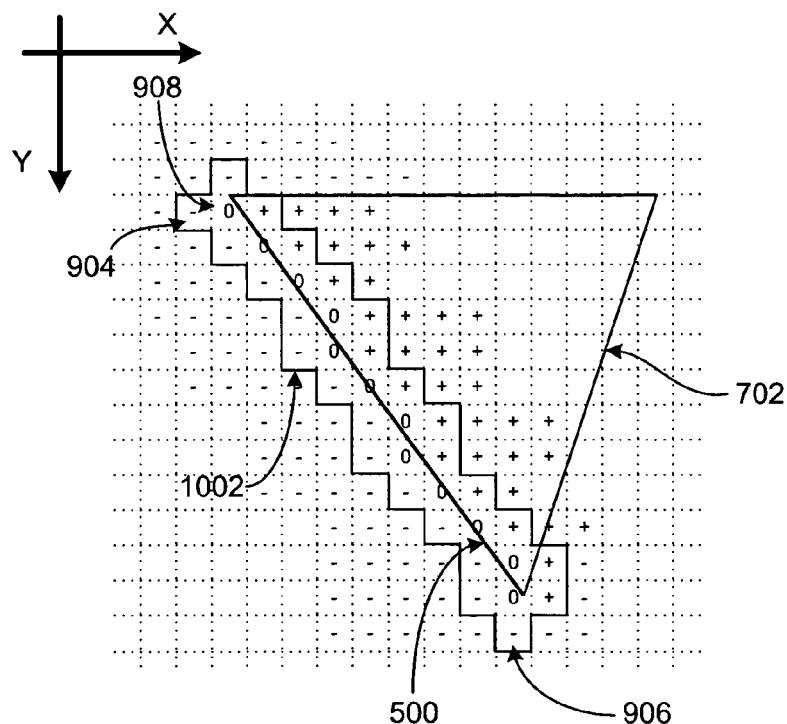
FIG. 10 is a plan view of isosceles triangle 702.

FIG. 10 is a plan view of isosceles triangle 702. Recall that the three edges of a triangle may be represented by planer (affine) functions that are negative to the left of the edge, positive to the right of the edge, and zero on the edge.

Pixels outside of isosceles triangle 702 are shown with a negative sign "−" and pixels inside isosceles triangle 702 with respect to straight line 500 (edge E0) are shown with a plus sign "+". Pixels on the edge E0 perimeter of isosceles triangle 702 are shown with a zero "0." Equations (39), (40), and (41) may be used to determine the −, +, 0 of each pixel.

For any given horizontal or vertical scan line, only the negative pixel or positive pixel immediately adjacent to the zero ("0") pixel may give illumination to straight line 500. Also included within FIG. 10 is a boundary 1002. Within boundary 1002 may be all pixels that potentially may have an effect on the display of straight line 500. Outside boundary 1002 may be all pixels that may have no effect on the display of straight line 500. An efficient rasterization of straight line 500 may evaluate for rasterization only those pixels located within boundary 1002.

With starting point (x0, y0) located at step 814, method 800 may evaluate for rasterization the negative pixels and/or positive pixels immediately adjacent to this zero ("0") pixel. At step 818, method 800 may compute the values for the three edge equations of Ei((x0)−1, y0) and may determine whether to rasterize the pixel. At step 820, method 800 may compute the values for the three edge equations of Ei(x0, (y0)−1) and may determine whether to rasterize the pixel. At step 822, method 800 may compute the values for the three edge equations of Ei((x0)+1, y0) and determine whether to rasterize the pixel.

At step 824, method 800 may set a horizontal incremental value f=0 and a vertical incremental value g=1. By setting the horizontal incremental value f=0 and the vertical incremental value g=1, method 800 may move vertically down one pixel to evaluate that pixel. At step 826, method 800 may determine whether (x0+f, y0+g)=(x1, y1). If (x0+f, y0+g) does equal (x1, y1), then method 800 has reached the pixel containing endpoint 504 of straight line 500 and proceeds to step 854. If (x0+f, y0+g) does not equal (x1, y1), then method 800 has not reached the pixel containing endpoint 504 of straight line 500.

If (x0+f, y0+g) does not equal (x1, y1), method 800 may determine whether the value for edge equation Ei(x0+f, y0+g) is negative, zero, or positive at step 828.

If the value for edge equation Ei(x0+f, y0+g) is negative, then method 800 may compute the values for the edge equation Ei(x0+f, y0+g) and may determine whether to rasterize the pixel at step 830. At step 832, method 800 may compute the values for the edge equation Ei(x0+f+1, y0+g) and may determine whether to rasterize the pixel. At step 834, method 800 may compute the values for the edge equation Ei(x0+f+2, y0+g) and may determine whether to rasterize the pixel.

At step 836, set f=f+1 and g=g+1 and method 800 may return to step 826.

If the value for edge equation Ei(x0+f, y0+g) is zero, then method 800 may compute the values for the edge equation Ei(x0+f−1, y0+g) and may determine whether to rasterize the pixel at step 838. At step 840, method 800 may compute the values for the edge equation Ei(x0+f, y0+g) and may determine whether to rasterize the pixel. At step 842, method 800 may compute the values for the edge equation Ei(x0+f+1, y0+g) and may determine whether to rasterize the pixel.

At step 844, set g=g+1 and method 800 may return to step 826.

If the value for edge equation Ei(x0+f, y0+g) is positive, then method 800 may compute the values for the edge equation Ei(x0+f, y0+g) and may determine whether to rasterize the pixel at step 846. At step 848, method 800 may compute the values for the edge equation Ei(x0+f−1, y0+g) and may determine whether to rasterize the pixel. At step 850, method 800 may compute the values for the edge equation Ei(x0+f−2, y0+g) and may determine whether to rasterize the pixel.

At step 852, set f=f−1 and g=g+1 and method 800 may return to step 826.

If (x0+f, y0+g) does equal (x1, y1) at step 826, then the rasterization process may have reached that pixel that contains endpoint 504 of straight line 500 and method 800 may conclude at step 854 that the pixel contains the ending point 504 (x1, y1) of straight line 500.

At step 856, method 800 may compute the values for the three edge equations of Ei(x1, y1) and may determine whether to rasterize the pixel. At step 858, method 800 may compute the values for the three edge equations of Ei((x1)−1, y0) and may determine whether to rasterize the pixel. At step 860, method 800 may compute the values for the three edge equations of Ei(x1, (y0)+1) and may determine whether to rasterize the pixel. At step 862, method 800 may compute the values for the three edge equations of Ei((x1)+1, y0) and may determine whether to rasterize the pixel.

If method 800 determines not to rasterize a given pixel, then no rasterization information for that given pixel is stored in drawing memory 112. If method 800 determines to rasterize a given pixel, then the rasterization information may be stored in drawing memory 112. The stored rasterization information may include a compiled set of display points that define a two dimensional representation of a straight line graphic object. In the present example, the straight line graphic object is base 500 of FIG. 7.

With the relevant pixels fully rasterized and the bitmap information stored in drawing memory 112, method 800 may pass the bitmap information to frame buffer 116 of FIG. 1 at step 864. At step 866, frame buffer 116 may pass the bitmap information to display screen 118, where a screen space straight line of model space line 500 may be displayed.

In addition to the above, method 800 may employ additional device-level techniques to smooth a stair step appearance of a raster straight line segment, such as the digital differential analyzer (DDA) algorithm and Bresenahm's line algorithm. Both the DDA algorithm and Bresenahm's line algorithm are based on adjusting pixel intensities along the line path.

It is not necessary to test all three edges of triangle 702. Prior to testing, it is known that Edge E0 is the base of triangle 702, and therefore the desired line. The remaining two edges were predetermined and, thus, information is known about the two remaining edges of triangle 702. In testing Edge E0, the process essentially just straddle's the line, and whether or not the process cross the remaining two edges may make little difference in the process. Crossing one of the remaining two edges may inform the process that it has reached the end of the line, but the bounding box provides a technique for already making such a determination. Thus, it may only be necessary to test edge E0 to rasterize the line.

Figure 11:
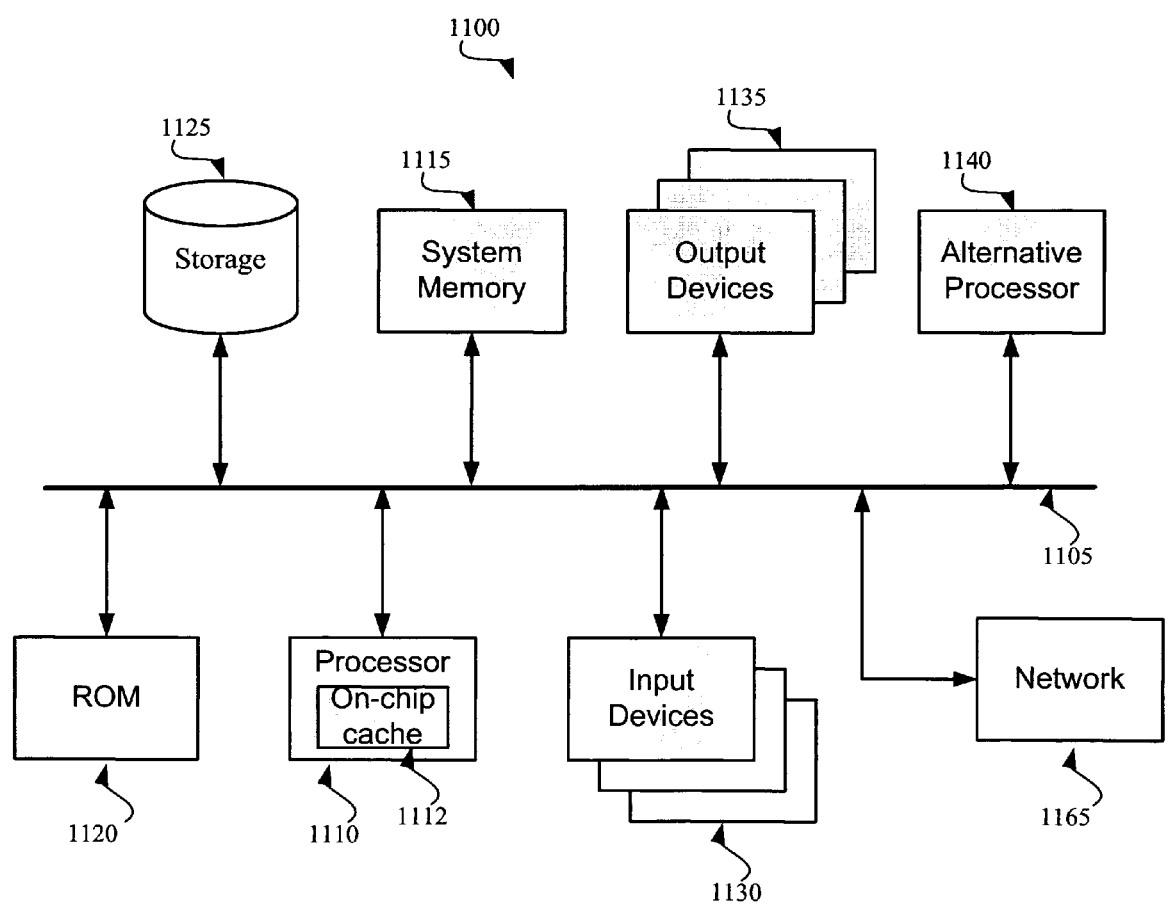
FIG. 11 is a computer system 1100 with which some embodiments may be implemented.

FIG. 11 is a computer system 1100 with which some embodiments may be implemented. In some embodiments, the disclosed techniques may be hard-coded into hardware devices dedicated specifically for graphics production and/or implemented in computer executable instructions stored in a computer readable medium (software).

The computer system 1100 may include a bus 1105, a processor 1110, a system memory 1115, a read-only memory 1120, a permanent storage device 1125, input devices 1130, output devices 1135, and an alternative processor 1140.

The bus 1105 may collectively represent all system, peripheral, and chipset buses that communicatively connect the numerous internal devices of the computer system 1100. For instance, the bus 1105 may communicatively connect the processor 1110 with the read-only memory 1120, the system memory 1115, and the permanent storage device 1125.

The read-only-memory (ROM) 1120 may store static data and instructions that may be needed by the processor 1110 and other modules of the computer system. The permanent storage device 1125, on the other hand, may be a read-and-write memory device. This device may be a non-volatile memory unit that stores instruction and data even when the computer system 1100 may be off. Some embodiments may utilize a mass-storage device (such as a magnetic or optical disk and its corresponding disk drive) as the permanent storage device 1125. Other embodiments may utilize a removable storage device (such as a floppy disk or zip® disk, and its corresponding disk drive) as the permanent storage device.

Like the permanent storage device 1125, the system memory 1115 may be a read-and-write memory device. However, unlike storage device 1125, the system memory may be a volatile read-and-write memory, such as a random access memory (RAM). The system memory may store some of the instructions and data that the processor needs at runtime.

In some embodiments, instructions and/or data needed to perform methods disclosed herein may be stored in the system memory 1115, the permanent storage device 1125, the read-only memory 1120, or any combination of the three. For example, the various memory units may contain instructions of an application and/or graphics data generated by the application. In some embodiments, the system memory 1115 and/or the permanent storage device 1125 may comprise a cache and/or buffer.

From these various memory units, the processor 1110 may retrieve instructions to execute and data to process to perform the processes disclosed herein. In some embodiments, the processor 1110 may utilize an on-chip cache 1112 to hold data recently accessed or produced by the processor 1110. In some embodiments, the alternative processor 1140 may execute instructions and processes data to perform the processes disclosed herein.

The bus 1105 also may connect to the input and output devices 1130 and 1135. The input devices 1130 may enable a user to communicate information and select commands to the computer system 1100. The input devices 1130 may include alphanumeric keyboards and cursor-controllers. The output devices 1135 may print or display images generated by the computer system 1100. The output devices may include printers and display devices, such as cathode ray tubes (CRT) or liquid crystal displays (LCD).

Finally, as shown in FIG. 11, the bus 1105 also may couple the computer system 1100 to a network 1165 through, for example, a network adapter (not shown). In this manner, the computer system 1100 may be a part of a network of computers (such as a local area network ("LAN"), a wide area network ("WAN"), or an Intranet) or a network of networks (such as the Internet). Any or all of the components of the computer system 1100 may be used. However, one of ordinary skill in the art would appreciate that any other system configuration also may be used.

Use of existing 3D graphics accelerator routines minimizes the power needed to generate a line. This is important particularly in low power resource systems, such as a cell phone and a watch.

While details have been described with reference to numerous specific details, one of ordinary skill in the art will recognize that the details may be embodied in other specific forms without departing from the spirit of the disclosure. Thus, one of ordinary skill in the art would understand that the disclosed details are not to be limited by the foregoing illustrative details, but rather is to be defined by the appended claims.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure. Moreover, method steps may be interchanged without departing from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may be read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or utilize the same. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A computer readable medium comprising instructions executable by a computer to perform a method to compile a set of display points that define a two dimensional representation of a straight line graphic object using three dimensional rasterization algorithms, the method comprising:
   receiving data that defines three vertices (x0, y0, K0), (x1, y1, K1), and (x2, y2, K2) of a triangle primitive, where attributes K2=(K0+K1)/2, where coordinates (x0, y0), (x1, y1), and (x2, y2) form an isosceles triangle primitive, and where coordinates (x0, y0) and (x1, y1) define a base of the isosceles triangle primitive; and
   rendering the isosceles triangle primitive using three dimensional rasterization algorithms to obtain the set of display points that define a two dimensional representation of the base of the isosceles triangle primitive,
   wherein the attributes K0, K1, and K2 include one or more color attributes.

2. The computer readable medium of claim 1, the method further comprising:
   receiving data that defines a straight line, where the data includes a starting point having coordinates (x0, y0) and attributes K0 and an ending point having coordinates (x1, y1) and attributes K1;
   selecting attributes K2 for a third point having coordinates (x2, y2) where K2=(K0+K1)/2; and
   selecting the coordinates (x2, y2) for the third point to form the isosceles triangle primitive.

3. The computer readable medium of claim 2 where if y0≠y1 then selecting the coordinates (x2, y2) for the third point includes deriving an equation of a perpendicular bisecting line of the base.

4. The computer readable medium of claim 1 where if x0=x1 then x2 and y2 are defined as x2=x0+2/(y1−y0) and y2=(y1+y0)/2.

5. The computer readable medium of claim 1 where if y0=y1 then x2 and y2 are defined as y2=y0+2/(x1−x0) and x2=(x1+x0)/2.

6. The computer readable medium of claim 1 where the isosceles triangle primitive defines an area and if y0≠y1 and x0<x1 then x2 and y2 are defined as y2≧y0 and x2≧x0 and a definition is selected from the group consisting of area=1, y2=y0, and x2=x0.

7. The computer readable medium of claim 1 where the isosceles triangle primitive defines an area and if y0≠y1 and x0>x1 then x2 and y2 are defined as y2>(y1+y0)/2 and x2>(x1+x0)/2 and a definition is selected from the group consisting of area=1, y2=y1, and x2=x0.

8. The computer readable medium of claim 1, where rendering the isosceles triangle primitive includes:
   locating a first pixel that contains the starting point (x0, y0),
   setting a horizontal incremental value f=0 and a vertical incremental value g=1, and
   determining whether (x0+f, y0+g)=(x1, y1).

9. The computer readable medium of claim 8, where if (x0+f, y0+g)≠(x1, y1), then rendering the isosceles triangle primitive further includes computing the value of edge equation E0 for a second pixel that contains the point (x0+f, y0+g), computing the value of edge equation E0 for a third pixel located immediately to the left of the second pixel if E0=0 for the second pixel, and computing the value of edge equation E0 for a fourth pixel located immediately to the right of the second pixel if E0=0 for the second pixel.

10. The computer readable medium of claim 9, where rendering the isosceles triangle primitive further includes determining whether to rasterize the second pixel if E0=0 for the second pixel, determining whether to rasterize the third pixel if E0=0 for the second pixel, and determining whether to rasterize the fourth pixel if E0=0 for the second pixel.

11. A device to compile a set of display points that define a two dimensional representation of a straight line graphic object using three dimensional rasterization algorithms, the device comprising:
   a three dimensional graphics accelerator having a drawing memory configured to receive data that defines three vertices (x0, y0, K0), (x1, y1, K1), and (x2, y2, K2) of a triangle primitive, where attributes K2=(K0+K1)/2, where coordinates (x0, y0), (x1, y1), and (x2, y2) form an isosceles triangle primitive, and where coordinates (x0, y0) and (x1, y1) define a base of the isosceles triangle primitive, and
   the three dimensional graphics accelerator farther having a drawing processor configured to render the isosceles triangle primitive using three dimensional rasterization algorithms to obtain the set of display points that define a two dimensional representation of the base of the isosceles triangle primitive,
   wherein the attributes K0, K1, and K2 include one or more color attributes.

12. The device of claim 11, further comprising:
   a system processor configured to receive data that defines a straight line, where the data includes a starting point having coordinates (x0, y0) and attributes K0 and an ending point having coordinates (x1, y1) and attributes K1, to select attributes K2 for a third point having coordinates (x2, y2) where K2=(K0+K1)/2, and to select the coordinates (x2, y2) for the third point to form the isosceles triangle primitive.

13. The device of claim 12, further comprising a display device configured to display the base as a straight line graphic object.

14. The device of claim 11 where if x0=x1 then x2 and y2 are defined as x2=x0+2/(y1−y0) and y2=(y1−y0)/2.

15. The device of claim 11 where if y0=y1 then x2 and y2 are defined as y2=y0+2/(x1−x0) and x2=(x1+x0)/2.

16. The device of claim 11 where the isosceles triangle primitive defines an area and if y0≠y1 and x0<x1 then x2 and y2 are defined as y2≧y0 and x2≧x0 and a definition is selected from the group consisting of area=1, y2=y0, and x2=x0.

17. The device of claim 11 where the isosceles triangle primitive defines an area and if y0≠y1 and x0>x1 then x2 and y2 are defined as y2>(y1+y0)/2 and x2>(x1+x0)/2 and a definition is selected from the group consisting of area=1, y2=y1, and x2=x0.

18. A device to compile a set of display points that define a two dimensional representation of a straight line graphic object using three dimensional rasterization algorithms, the device comprising:
   means for receiving data that defines three vertices (x0, y0, K0), (x1, y1, K1), and (x2, y2, K2) of a triangle primitive, where attributes K2=(K0+K1)/2, where coordinates (x0, y0), (x1, y1), and (x2, y2) form an isosceles triangle primitive, and where coordinates (x0, y0) and (x1, y1) define a base of the isosceles triangle primitive, and means for rendering the isosceles triangle primitive using three dimensional rasterization algorithms to obtain the set of display points that define a two dimensional representation of the base of the isosceles triangle primitive, wherein the attributes K0, K1, and K2 include one or more color attributes.

19. The device of claim 18, further comprising:

a system processor configured to receive data that defines a straight line, where the data includes a starting point having coordinates (x0, y0) and attributes K0 and an ending point having coordinates (x1, y1) and attributes K1, to select attributes K2 for a third point having coordinates (x2, y2) where K2=(K0+K1)/2, and to select the coordinates (x2, y2) for the third point to form the isosceles triangle primitive.

20. The device of claim 18 where the means for receiving is a drawing memory.

21. The device of claim 18 where the means for rendering is a drawing processor.

22. The device of claim 11 where (i) if x0=x1 then x2 and y2 are defined as x2=x0+2/(y1−y0) and y2=(y1+y0)/2, (ii) if y0=y1 then x2 and y2 are defined as y2=y0+2/(x1−x0) and x2=(x1+x0)/2, (iii) if y0≠y1 and x0<x1 then the isosceles triangle primitive defines an area and x2 and y2 are defined as y2≧y0 and x2≧x0 and a definition is selected from the group consisting of area=1, y2=y0, and x2=x0, and (iv) if y0≠y1 and x0>x1 then the isosceles triangle primitive defines an area and x2 and y2 are defined as y2>(y1+y0)/2 and x2>(x1+x0)/2 and a definition is selected from the group consisting of area=1, y2=y1, and x2=x0.

23. A method to compile a set of display points that define a two dimensional representation of a straight line graphic object using three dimensional rasterization algorithms, the method comprising:

receiving data that defines three vertices (x0, y0, K0), (x1, y1, K1), and (x2, y2, K2) of a triangle primitive, where attributes K2=(K0+K1)/2, where coordinates (x0, y0), (x1, y1), and (x2, y2) form an isosceles triangle primitive, and where coordinates (x0, y0) and (x1, y1) define a base of the isosceles triangle primitive; and rendering the isosceles triangle primitive using three dimensional rasterization algorithms to obtain the set of display points that define a two dimensional representation of the base of the isosceles triangle primitives, wherein the attributes K0, K1, and K2 include one or more color attributes.

24. The method of claim 23, further comprising:

receiving data that defines a straight line, where the data includes a starting point having coordinates (x0, y0) and attributes K0 and an ending point having coordinates (x1, y1) and attributes K1;

selecting attributes K2 for a third point having coordinates (x2, y2) where K2=(K0+K1)/2; and selecting the coordinates (x2, y2) for the third point to form the isosceles triangle primitive, where if y0≠y1 then selecting the coordinates (x2, y2) for the third point includes deriving an equation of a perpendicular bisecting line of the base.

25. The method of claim 23 where if x0=x1 then x2 and y2 are defined as x2=x0+2/(y1−y0) and y2=(y1+y0)/2.

26. The method of claim 23 where (i) if x0=x1 then x2 and y2 are defined as x2=x0+2/(y1−y0) and y2=(y1+y0)/2, (ii) if y0=y1 then x2 and y2 are defined as y2=y0+2/(x1−x0) and x2=(x1+x0)/2, (iii) if y0≠y1 and x0<x1 then the isosceles triangle primitive defines an area and x2 and y2 are defined as y2≧y0 and x2≧x0 and a definition is selected from the group consisting of area=1, y2=y0, and x2=x0, and (iv) if y0≠y1 and x0>x1 then the isosceles triangle primitive defines an area and x2 and y2 are defined as y2>(y1+y0)/2 and x2>(x1+x0)/2 and a definition is selected from the group consisting of area=1, y2=y1, and x2=x0.

27. An integrated circuit device comprising:

a three dimensional graphics accelerator having a drawing memory configured to receive data that defines three vertices (x0, y0, K0), (x1, y1, K1), and (x2, y2, K2) of a triangle primitive, where attributes K2=(K0+K1)/2, where coordinates (x0, y0), (x1, y1), and (x2, y2) form an isosceles triangle primitive, and where coordinates (x0, y0) and (x1, y1) define a base of the isosceles triangle primitive, and the three dimensional graphics accelerator further having a drawing processor configured to render the isosceles triangle primitive using three dimensional rasterization algorithms to obtain a set of display points that define a two dimensional representation of the base of the isosceles triangle primitive, wherein the attributes K0, K1, and K2 include one or more color attributes.

28. The device of claim 27, further comprising:

a system processor configured to receive data that defines a straight line, where the data includes a starting point having coordinates (x0, y0) and attributes K0 and an ending point having coordinates (x1, y1) and attributes K1, to select attributes K2 for a third point having coordinates (x2, y2) where K2=(K0+K1)/2, and to select the coordinates (x2, y2) for the third point to form the isosceles triangle primitive.

29. The device of claim 28, further comprising a display device configured to display the base as a straight line graphic object.

30. The device of claim 27 where if x0=x1 then x2 and y2 are defined as x2=x0+2/(y1−y0) and y2=(y1+y0)/2.

31. The device of claim 27 where if y0=y1 then x2 and y2 are defined as y2=y0+2/(x1−x0) and x2=(x1+x0)/2.

32. The device of claim 27 where the isosceles triangle primitive defines an area and if y0≠y1 and x0<x1 then x2 and y2 are defined as y2≧y0 and x2≧x0 and a definition is selected from the group consisting of area=1, y2=y0, and x2=x0.

33. The device of claim 27 where the isosceles triangle primitive defines an area and if y0≠y1 and x0>x1 then x2 and y2 are defined as y2>(y1+y0)/2 and x2>(x1+x0)/2 and a definition is selected from the group consisting of area=1, y2=y1, and x2=x0.

34. The device of claim 27, wherein the drawing processor locates a first pixel that contains the starting point (x0, y0), sets a horizontal incremental value f=0 and a vertical incremental value g=1, and determines whether (x0+f, y0+g)=(x1, y1).

35. The device of claim 34, where if (x0+f, y0+g)≠(x1, y1), then the drawing processor computes the value of edge equation E0 for a second pixel that contains the point (x0+f, y0+g), computes the value of edge equation E0 for a third pixel located immediately to the left of the second pixel if E0=0 for the second pixel, and computes the value of edge equation E0 for a fourth pixel located immediately to the right of the second pixel if E0=0 for the second pixel.

36. The device of claim 35, where the drawing processor determines whether to rasterize the second pixel if E0=0 for the second pixel, determines whether to rasterize the third pixel if E0=0 for the second pixel, and determines whether to rasterize the fourth pixel if E0=0 for the second pixel.

37. The device of claim 27 where
(i) if x0=x1 then x2 and y2 are defined as x2=x0+2/(y1−y0) and y2=(y1+y0)/2,
(ii) if y0=y1 then x2 and y2 are defined as y2=y0+2/(x1−x0) and x2=(x1+x0)/2,
(iii) if y0≠y1 and x0<x1 then the isosceles triangle primitive defines an area and x2 and y2 are defined as y2≧y0 and x2≧x0 and a definition is selected from the group consisting of area=1, y2=y0, and x2=x0, and
(iv) if y0≠y1 and x0>x1 then the isosceles triangle primitive defines an area and x2 and y2 are defined as y2>(y1+y0)/2 and x2>(x1+x0)/2 and a definition is selected from the group consisting of area=1, y2=y1, and x2=x0.

* * * * *